(12) United States Patent
Beranek et al.

(10) Patent No.: US 11,480,749 B2
(45) Date of Patent: Oct. 25, 2022

(54) MULTICORE FIBER OPTIC CABLE

(71) Applicant: United States of America, as represented by the Secretary of the Navy, Patuxent River, MD (US)

(72) Inventors: Mark Beranek, Hollywood, MD (US); Jordan Hollady, Lexington Park, MD (US); John Diehl, Clinton, MD (US); Jason McKinney, Bowie, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 93 days.

(21) Appl. No.: 17/161,098

(22) Filed: Jan. 28, 2021

(65) Prior Publication Data

US 2021/0318505 A1 Oct. 14, 2021

Related U.S. Application Data

(60) Provisional application No. 63/009,489, filed on Apr. 14, 2020.

(51) Int. Cl.
*G02B 6/44* (2006.01)
*G02B 6/02* (2006.01)

(52) U.S. Cl.
CPC ........ *G02B 6/443* (2013.01); *G02B 6/02042* (2013.01); *G02B 6/4407* (2013.01); *G02B 6/4413* (2013.01); *G02B 6/4434* (2013.01)

(58) Field of Classification Search
None
See application file for complete search history.

(56) References Cited

U.S. PATENT DOCUMENTS 5,590,233 A * 12/1996 Carratt ................ G02B 6/4482
385/100
2018/0243136 A1* 8/2018 Diao ..................... A61B 18/22

FOREIGN PATENT DOCUMENTS

JP 2006047545 A * 2/2006

OTHER PUBLICATIONS

Urick, et al., Laser Noise and Its Impact on the Performance of Intensity-Modulation with Direct-Detection Analog Photonic Links, NRL/MR/5652-07-9065, Naval Research Laboratory, Aug. 10, 2007.
Diehl, et al., Measurement and Discussion of a Balanced Photonic Link Utilizing Dual-Core Optical Fiber, Proc. IEEE Avionics and Vehicle Fiber Optics and Photonics Conference, 2019.

* cited by examiner

*Primary Examiner* — Michelle R Connelly
*Assistant Examiner* — Shojan P Pavunny
(74) *Attorney, Agent, or Firm* — Mark O. Glut; NAWCAD

(57) ABSTRACT

A multicore fiber optic cable comprising of a central fiber having a central fiber outer diameter, a central fiber coating surrounding the central fiber outer diameter of the central fiber, the central fiber coating having a continuous spiraled groove around the central fiber outer diameter, a dual core optical fiber having a dual core optical fiber geometry, the dual core optical fiber spiraled around the central fiber coating and disposed within the spiraled groove such that the dual core optical fiber is wound around the central fiber coating in a spiral pattern and the central fiber core geometry and the dual core optical fiber geometry are oriented longitudinally to negate link path length difference; and an outer sheath surrounding the central fiber coating and the dual core optical fiber.

1 Claim, 4 Drawing Sheets

MULTICORE FIBER OPTIC CABLE

STATEMENT OF GOVERNMENT INTEREST

The invention described herein may be manufactured and used by or for the Government of the United States of America for governmental purposes without payment of any royalties thereon or therefor.

BACKGROUND

Fiber optic based photonic links are often used in high bandwidth analog and digital communication applications. Photonics and fiber optics offers numerous advantages over traditional radio frequency hardware and electrical interconnects for various analog link applications. Such advantages include reduced weight, immunity to electromagnetic interference, increased flexibility, larger bandwidth in fiber, and reduced loss in fiber. Many analog photonic link applications have critical sensitivity and linearity requirements. Noise figure, link gain, compression dynamic range and spurious free dynamic range are key performance parameters for analog links. Intensity modulation with direct detection (IMDD) is an analog link modulation scheme where the intensity of an optical source is modulated by the analog signal. Demodulation is achieved through direct detection of the optical carrier and conversion using a photodetector. FIG. 1 (not admitted to be prior art) derived from Naval Research Laboratory report NRL/MR/5652-07-9065 (incorporated by reference and not admitted to be prior art) allows one to understand the schematic and operation of a traditional IMDD analog photonic link 20. Polarization-maintaining optical fiber 21 connects the laser to the Mach-Zehnder Modulator (MZM) 24. A single core single-mode optical fiber 23 connects the MZM 24 to a single photodetector 25. RF i/p=RF input to the MZM 26. RF o/p=RF output 28 from the photodetector. A bias voltage circuit 27 sets the MZM operating point at quadrature.

Balanced IMDD links offer a performance advantage over traditional unbalanced IMDD links in terms of noise suppression and link gain (see references 1-3 in J. Diehl, et al, "Measurement and discussion of a balanced photonic link utilizing dual-core optical fiber," *Proc. IEEE Avionics and Vehicle Fiber Optics and Photonics Conference*, 2019, this reference is not admitted to be prior art). FIG. 2 (not admitted to be prior art) 30 illustrates a balanced IMDD link schematic based on two individual single-core fibers 31 interfaced to the output of a dual-output MZM 32 and to the input of a balanced photodetector 33. RF Out 34=RF output from the balanced photodetector 33. Using both output arms of an external intensity modulator results in twice the photocurrent collected. This corresponds to four times (6 dB) more gain. More importantly, common mode noise (such as laser noise, or spontaneous emission noise from an erbium-doped fiber amplifier before the modulator) is differenced at the balanced photodetector, resulting in significant noise suppression in a typical link. Efficient use of optical power and noise cancellation can be achieved at the same time resulting in higher link gain, lower noise figure, and higher spurious free dynamic range.

Building a balanced link becomes progressively more difficult as the modulation frequency increases. This is due to the ever-tightening phase-tolerance as the modulation signal's frequency increases and wavelength decreases. At frequencies above 10 GHz, maintaining steady balanced phase over any appreciable transmission distance (several meters) is limited by temperature and physical effects on the two individual single-core optical fibers. Again referring to FIG. 2, any effective change in fiber optic length on the order of micrometers can begin to unbalance a high frequency analog photonic link.

A balanced IMDD analog photonic link based on one dual-core optical fiber can mitigate the temperature and physical effects that cause a high frequency analog photonic link to become unbalanced over any appreciable link distance (see FIG. 3, not admitted to be prior art) 40. With both outputs of the modulator traveling down independent single-mode cores in a single fiber 45, the effects of temperature and mechanical stress is minimized wherein any effect impacting one core would be expected to impact the other core as well.

Fiber optic cable bending can cause the link to become unbalanced, due to the differential radius of the independent cores inside the dual-core optical fiber. The dual-core fiber optic cable design described in this disclosure is meant to negate/minimize differences in path delay due to fiber optic cable bending, thereby mitigating the net effect of bending the cable in any direction when the fiber optic cable is installed on an aerospace platform or other physical structure. It achieves this by effectively orienting the two cores parallel to the longitudinal axis of the cable 10 and spiraling the dual-core optical fiber around the central axis of the cable 10, ensuring a statistical averaging of their effective relative path lengths. It prevents one core from being on the outside (longer path-length) of the bend's radius for the entire length of the bend. Doing so prevents the accumulation of phase error due to the bend, instead limiting the total phase error to the modulus of the spiral length and the total length of the bent fiber. FIG. 8 illustrates a balanced IMDD analog photonic link 50 utilizing a dual core optical fiber cable 10. The dual core optical fiber is snap fit within a spiraled groove in the polymer coating, which is protected by a polymer outer sheath. Dual core fiber optic connectors 53 with optical fan-in 54/fan-out 55 fibers or waveguides couple light into and out of the dual core optical fiber cable 10.

SUMMARY

The present invention is directed to a multicore fiber optic cable with the needs enumerated above and below.

The present invention is directed to a multicore fiber optic cable based on dual core optical fiber and a fiber optic cable with a spiraled groove.

It is a feature of the present invention to provide a multicore fiber optic cable based on dual core optical fiber.

It is a feature of the present invention to provide a multicore fiber optic cable based on a fiber optic cable that has a dual core optical fiber spiraled around a central fiber or wire.

It is a feature of the present invention to provide a snap fit geometry for the spiraled dual core optical fiber to reside.

It is a feature of the present invention to provide a cable design with an outer sheath, a strength member, and an outer jacket.

DRAWINGS

These and other features, aspects and advantages of the present invention will become better understood with reference to the following description and appended claims, and accompanying drawings wherein:

FIG. 1 is a schematic of a traditional intensity modulation with direct detection photonic link based on one single core optical fiber and one photodetector. Traditional intensity modulation with direct detection photonic links employ a laser, Mach-Zehnder modulator (MZM), and photodetector. Polarization-maintaining optical fiber connects the laser to the MZM. A single core single-mode optical fiber connects the MZM to a single photodetector. RF i/p=RF input to the MZM. RF o/p=RF output from the photodetector. A bias voltage circuit sets the MZM operating point at quadrature.

FIG. 2 illustrates a balanced IMDD analog photonic link with two single core optical fibers and a balanced photodetector. Balanced intensity modulation with direct detection photonic link employs a laser, dual-output MZM, and balanced photodetector. Polarization-maintaining optical fiber connects the laser to the dual-output MZM. Two single core single-mode optical fibers connect the dual-output MZM to the balanced photodetector.

FIG. 3 illustrates a balanced IMDD analog photonic link with one dual core optical fiber and a balanced photodetector. Balanced intensity modulation with direct detection photonic link employs a laser, dual-output MZM, and balanced photodetector. Polarization-maintaining optical fiber connects the laser to the dual-output MZM. One two-core single-mode optical fiber connects the dual-output MZM to the balanced photodetector.

Figure 7:
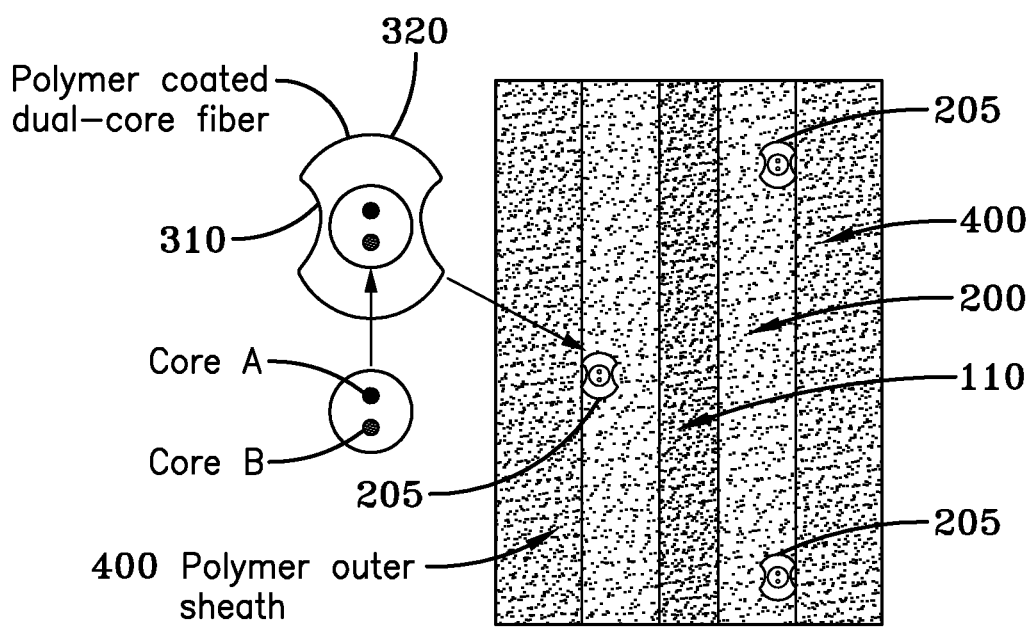

FIG. 7 illustrates the dual core fiber optic cable polymer coating structure with spiraled groove mechanical feature, which enables the dual core optical fiber to snap fit into the spiraled groove in the proper orientation as it coils around the polymer coating. The snap fit maintains core geometry and prevents fiber twist without requiring glue or sealant. The polymer outer sheath protects the coiled dual core optical fiber from damage.

Figure 8:
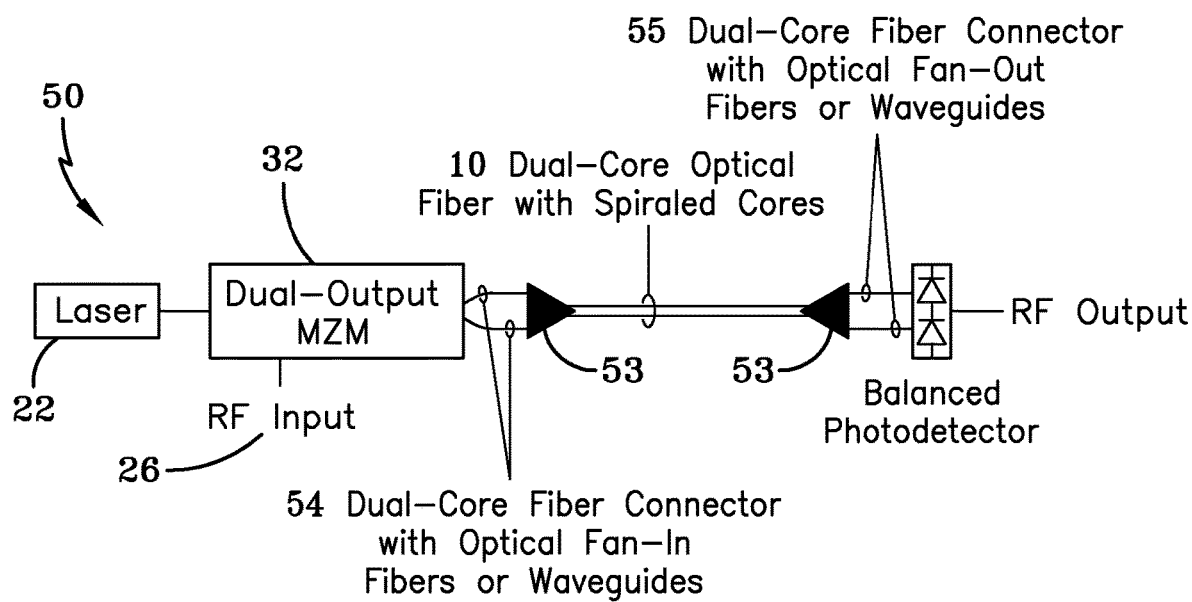

FIG. 8 illustrates a balanced IMDD analog photonic link utilizing a dual core optical fiber coiled around a polymer coated fiber or wire. The dual core optical fiber is snap fit within a spiraled groove in the polymer coating, which is protected by a polymer outer sheath. Dual core fiber optic connectors with optical fan-in/fan-out fibers or waveguides couples light into and out of the dual core optical fiber cable.

DESCRIPTION

Figure 1:
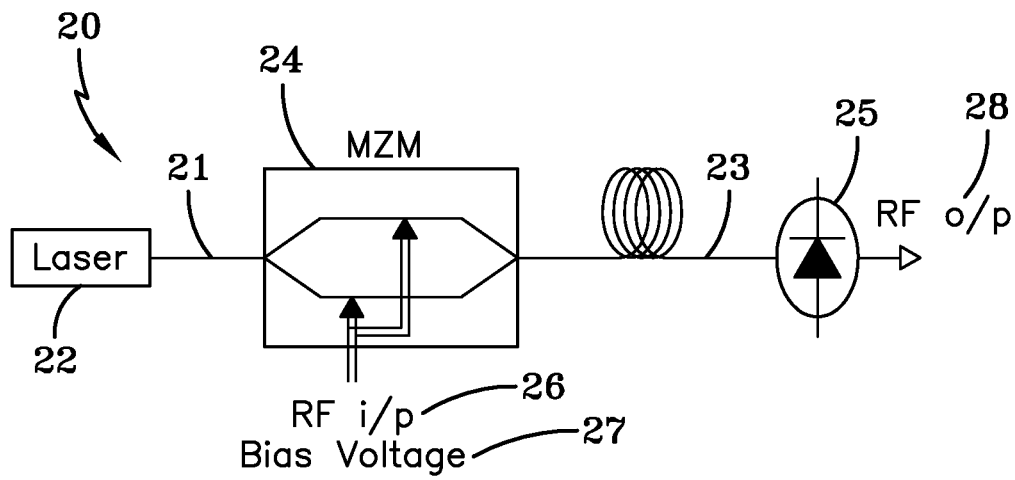
Figure 2:
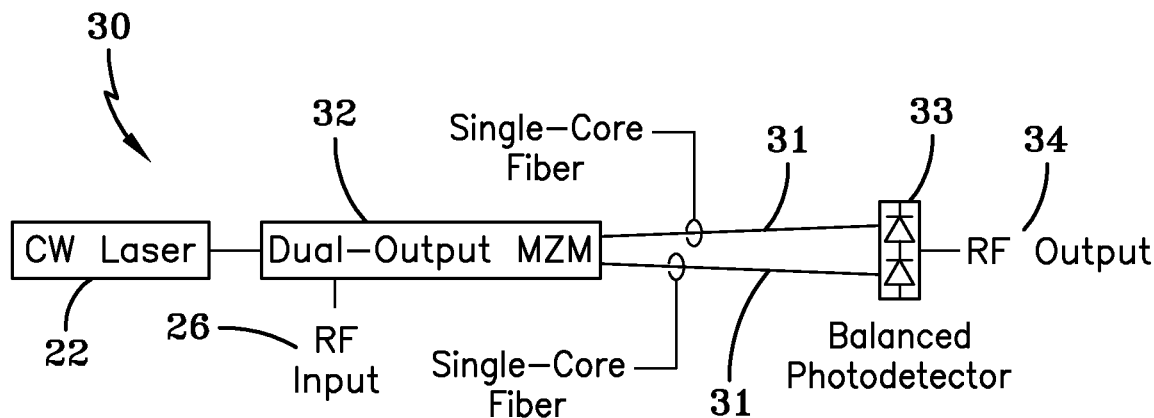
Figure 3:
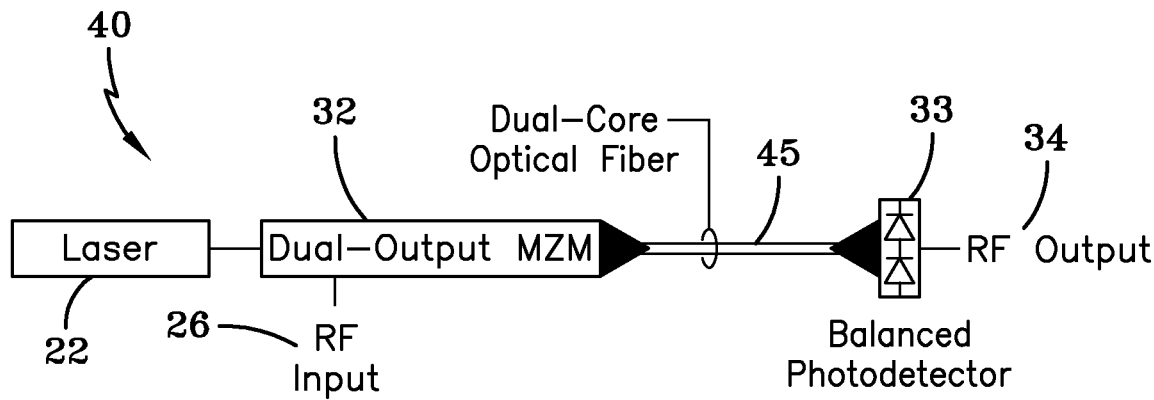
Figure 4:
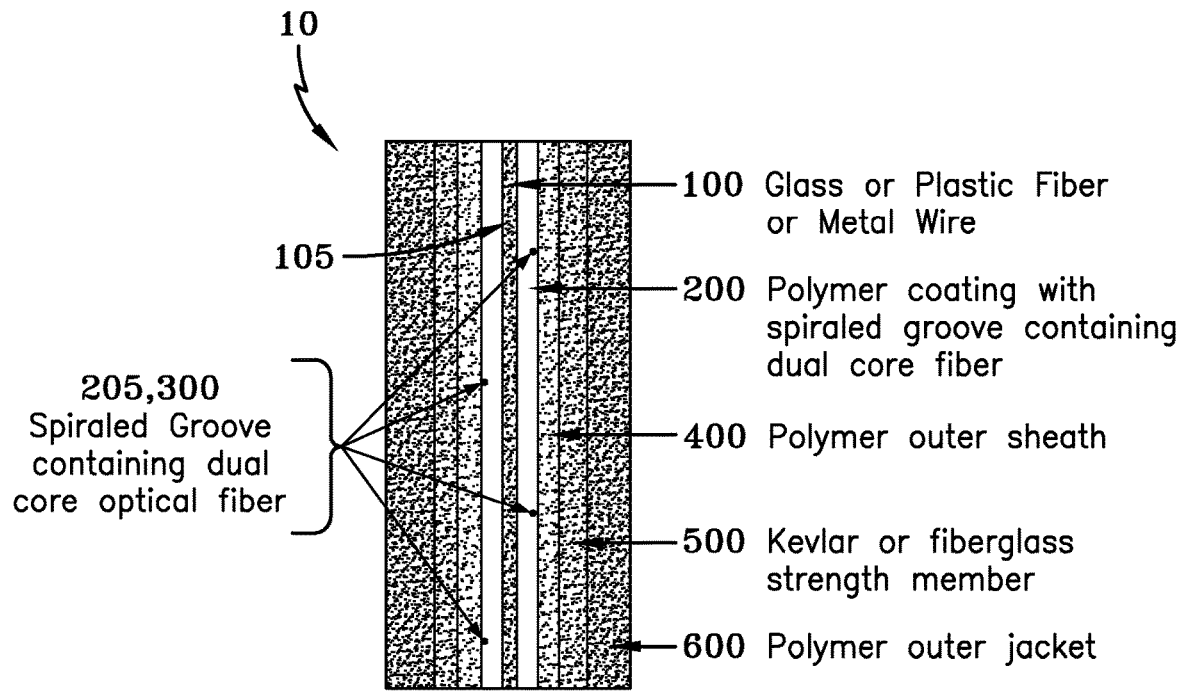
FIG. 4 illustrates a longitudinal cross-section view of a dual core fiber optic cable with a polymer coating structure and a spiraled groove designed to ensure the dual core optical fiber is snap fit into the spiraled groove. The snap fit maintains optical fiber core geometry and prevents fiber twist without requiring glue or sealant.
Figure 5:
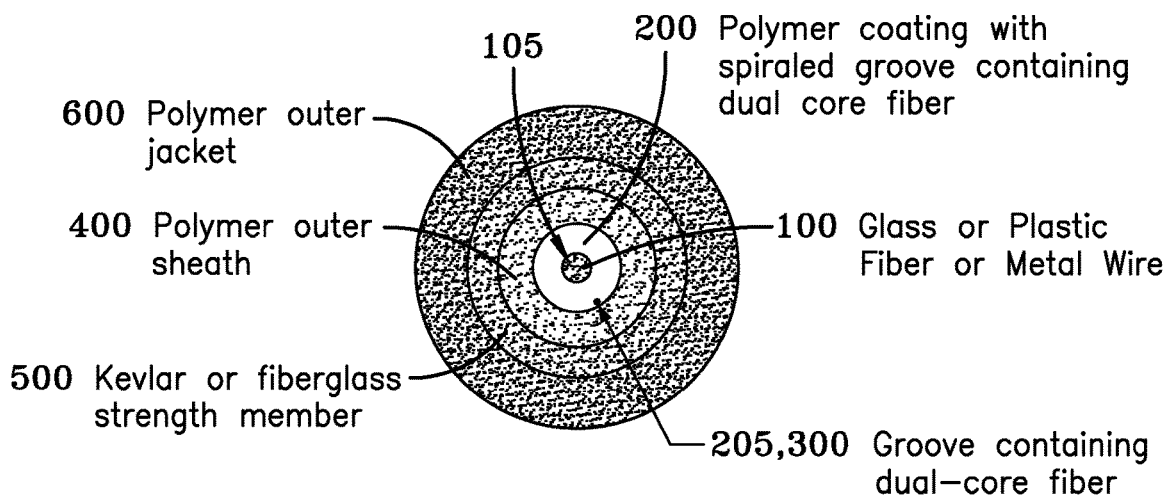
FIG. 5 illustrates a cross-section view of a dual core fiber optic cable.
Figure 6:
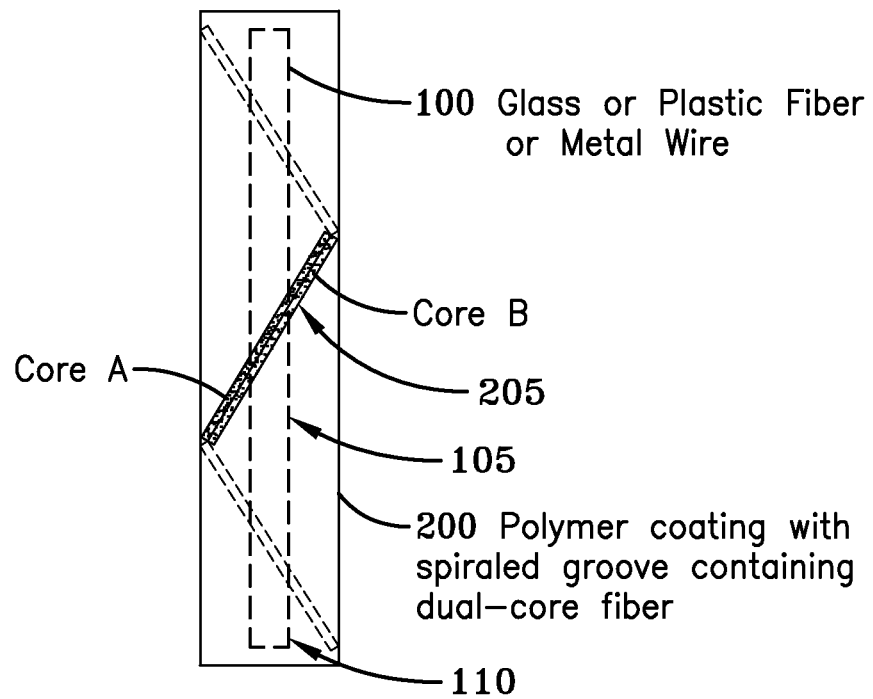
FIG. 6 illustrates the dual core fiber coiled around the polymer coating with spiraled groove.

The preferred embodiments of the present invention are illustrated by way of example below and in FIGS. 4-7. As seen in FIG. 4, a multicore fiber optic cable 10 includes a central fiber 100, a central fiber coating 200, a dual core fiber 300, an outer sheath 400, a strength member 500, and an outer jacket 600. The central fiber 100 has a central fiber outer diameter 105. The central fiber coating 200 surrounds the central fiber outer diameter 105 of the central fiber 100. The central fiber coating 200 has a continuous spiraled groove 205 around the outer surface of the central fiber coating 200. The dual core optical fiber 300 has a dual core optical fiber geometry 310. The dual core optical fiber 300 is spiraled around the central fiber coating 200 and is disposed within the spiraled groove 205 such that the dual core optical fiber 300 is wound around the central fiber coating 200 in a spiral pattern and the central fiber core geometry 110 and the dual core optical fiber geometry 310 is oriented longitudinally to negate link path length difference. The dual core optical fiber has a coating geometry 320 that enables the fiber to be snap fit into the spiraled groove 205. The outer sheath 400 surrounds the central fiber coating 200 and the dual core optical fiber 300. The strength member 500 and outer jacket 600 surrounds the outer sheath 400.

In the description of the present invention, the invention will be discussed in a military environment; however, this invention can be utilized for any type of application that requires use of fiber optic cable.

The central fiber 100 may be, but without limitation, a metal wire, a plastic fiber, glass fiber, or any material practicable. The multicore fiber optic cable 10 may further include a strength member 500 that is disposed within cable.

The outer sheath 400 can be made from polymer, while strength member 500 may be manufactured from fiberglass, Kevlar or any other material practicable. The cable 10 may further include an outer jacket 600 on the outside of all the other elements. The outer jacket 600 may be manufactured from polymer or any other material practicable.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A multicore fiber optic cable comprising of;
   a central fiber having a central fiber outer diameter;
   a central fiber coating surrounding the central fiber outer diameter of the central fiber, the central fiber coating having a continuous spiraled groove around the central fiber outer diameter;
   a dual core optical fiber having a dual core optical fiber geometry and a longitudinal axis, the dual core optical fiber spiraled around the central fiber coating and disposed within the spiraled groove such that the dual core optical fiber is wound around the central fiber coating in a spiral pattern and the central fiber core geometry and the dual core optical fiber geometry are oriented parallel to the longitudinal axis to negate link path length difference;
   an outer sheath surrounding the central fiber coating and the dual core optical fiber; and,
wherein the cable is employed in a balanced photonic link and
wherein the dual core optical fiber geometry has a coating wherein the coating has a cross section that is circular with two diametrically opposed elliptical sections removed, such that that the cross section enables the dual core optical fiber to be snap fit into the continuous spiraled groove.

* * * * *